United States Patent [19]

Ichigo

[11] Patent Number: 4,916,263
[45] Date of Patent: Apr. 10, 1990

[54] SWITCH FOR DETECTING SHIFT POSITIONS OF AUTOMATIC TRANSMISSION

[75] Inventor: Koichi Ichigo, Aichi, Japan
[73] Assignee: Aisin-Aw Kabushiki Kaisha, Japan
[21] Appl. No.: 268,756
[22] Filed: Nov. 9, 1988
[30] Foreign Application Priority Data Dec. 25, 1987 [JP] Japan .................. 62-326786

[51] Int. Cl.⁴ .......................................... H01H 19/54
[52] U.S. Cl. .................. 200/11 DA; 200/11 G
[58] Field of Search ............ 200/11 R, 11 DA, 11 G, 200/11 J, 11 K, 11 TW, 61.88, 61.89, 61.9, 61.91, 564, 570, 571, 572, 292

[56] References Cited

U.S. PATENT DOCUMENTS

| | | | |
|---|---|---|---|
| 2,908,777 | 10/1959 | Brown | 200/11 J |
| 3,939,313 | 2/1976 | Hayashi et al. | 200/11 J |
| 4,390,757 | 6/1988 | Wiessner | 200/11 G |
| 4,393,467 | 7/1983 | Miki et al. | 364/424.1 |

Primary Examiner—J. R. Scott
Attorney, Agent, or Firm—Lorusso & Loud

[57] ABSTRACT

In a switch for detecting shift positions of an automatic transmission in which a movable contact piece is moved in a linked relationship with the shifting over of shift positions of the transmission so as to effect switching with each of stationary contact pieces corresponding to the shift positions, stationary contact pieces for monitoring are disposed in combination with the stationary contact pieces corresponding to the shift positions, thereby enabling predetermined combination signasl to be output. In the detection error checking of this invention, auxiliary contact points for monitoring are used together with a plurality of stationary contact points so that combinations of contact pieces are determined with a certain regularity which is monitored by a control unit so as to check detection results.

5 Claims, 3 Drawing Sheets

| POSITIONS<br>CONTACT<br>POINTS | P | R | N | D | 3 | 2 | 1 |
|---|---|---|---|---|---|---|---|
| A | ON | ON | OFF | OFF | ON | ON | OFF |
| B | OFF | ON | ON | ON | ON | OFF | OFF |
| C | OFF | OFF | OFF | ON | ON | ON | ON |
| PA | ON | OFF | ON | OFF | ON | OFF | ON |

Fig. 2
(PRIOR ART)

| POSITIONS<br>CONTACT<br>POINTS | P | R | N | D | 2 | L |
|---|---|---|---|---|---|---|
| PL | ON | OFF | OFF | OFF | OFF | OFF |
| RL | OFF | ON | OFF | OFF | OFF | OFF |
| NL | OFF | OFF | ON | OFF | OFF | OFF |
| DL | OFF | OFF | OFF | ON | OFF | OFF |
| 2L | OFF | OFF | OFF | OFF | ON | OFF |
| LL | OFF | OFF | OFF | OFF | OFF | ON |

Fig. 4

| POSITIONS<br>CONTACT<br>POINTS | P | R | N | D | 3 | 2 | 1 |
|---|---|---|---|---|---|---|---|
| A | ON | ON | OFF | OFF | ON | ON | OFF |
| B | OFF | ON | ON | ON | ON | OFF | OFF |
| C | OFF | OFF | OFF | ON | ON | ON | ON |
| PA | ON | OFF | ON | OFF | ON | OFF | ON |

SWITCH FOR DETECTING SHIFT POSITIONS OF AUTOMATIC TRANSMISSION

BACKGROUND OF THE INVENTION

This invention relates to a switch for detecting shift positions of an automatic transmission.

In general, a conventional shift position detecting switch for automatic transmissions has contact points which are independently provided for respective shift positions and which are changed over to establish or cancel connection to a single load at each position.

The construction of this type of switch will be described below with reference to FIGS. 1 and 2.

FIG. 1 shows the arrangement of a six-position switch which is an example of this type of conventional shift position detecting switch for automatic transmissions.

As shown in FIG. 1, on a terminal plate 1 made of a resin are formed first and second rows of stationary contact pieces which extend circumferentially about a pivot support shaft 3 of a movable contact piece 2 at inner and outer positions, respectively. The first row consists of a contact piece $R_B$ connected to a power source, and the second row consists of a contact piece $P_L$ to which a parking display (load) is connected, a contact piece $R_L$ to which a reverse display (load) is connected, a contact piece $N_L$ to which a neutral display (load) is connected, a contact piece $D_L$ to which a D-range display (load) is connected, a contact piece $2_L$ to which a second-range display (load) is connected, and a contact piece $L_L$ to which a L-range display (load) is connected. That is, these stationary contact pieces are mounted in the terminal plate 1 by insert molding with a resin, and the movable contact piece 2 can be moved over the terminal plate 1 in a linked relationship with the shifting over of the shift positions of the automatic transmission so that it is connected to or disconnected from a contact point on the second-row contact piece with respect to each shift position. There is a desired arrangement of on-off states of the contact points of the second-row stationary contact pieces relative to the stationary contact piece $R_B$. FIG. 2 shows combinations of on and off states at respective positions.

The switching on/off operation at each position will be described below.

Firstly, when the movable contact piece 2 is placed at a position P (parking position) by being moved in a linked relationship with the shifting to the corresponding shift position of the automatic transmission, only the contact point $P_L$ becomes on while all the contact points $R_L$, $N_L$, $D_L$, $2_L$ and $L_L$ become off.

When the movable contact piece 2 is placed at a position R (reverse position), only the contact point $R_L$ becomes on while all the contact points $P_L$, $N_L$, $D_L$, $2_L$ and $L_L$ become off.

When the movable contact piece 2 is placed at a position N (neutral position), only the contact point $N_L$ becomes on while all the contact points $P_L$, $R_L$, $D_L$, $2_L$ and $L_L$ become off.

When the movable contact piece 2 is placed at a D-range position, only the contact point $D_L$ becomes on while all the contact points $P_L$, $R_L$, $N_L$, $2_L$ and $L_L$ become off.

When the movable contact piece 2 is placed at a second-range position, only the contact point $2_L$ becomes on while all the contact points $P_L$, $R_L$, $N_L$, $D_L$ and $L_L$ become off.

When the movable contact piece 2 is placed at a L-range position, only the contact point $L_L$ becomes on while all the contact points $P_L$, $R_L$, $N_L$, $D_L$ and $2_L$ become off.

In the above-described system, however, each shift position is ascertained from switching of the corresponding one of the contact points. If a certain abnormality takes place, it is impossible for a control unit to detect this abnormality and, hence, to perform fail-safe control.

SUMMARY OF THE INVENTION

In view of this problem, it is an object of the present invention to provide a shift position detecting switch for automatic transmissions which is capable of outputting a predetermined combination signal to the control unit to enable fail-safe control.

To this end, the present invention provides a switch for detecting shift positions of an automatic transmission in which a movable contact piece is moved in a linked relationship with the shifting over of shift positions of the transmission so as to effect switching with each of stationary contact pieces corresponding to the shift positions, the switch having stationary monitoring contact pieces disposed in combination with the stationary contact pieces corresponding to the shift positions in order to output a predetermined combination signal.

In accordance with the present invention, the shift positions of the automatic transmission are detected with, for example, four contact points consisting of contact pieces A, B, C, and a contact point on monitoring contact pieces PA, so that the number of lines for connection to a control unit and the number of input circuits become smaller than those of the conventional system. With respect to seven-position arrangement, seven connection lines and seven input circuits are required in the case of the conventional system but, in the case of the present invention, it is sufficient to provide only four connection lines and four input circuits, thus enabling a remarkable reduction in the number of parts in the peripheral circuit for the detection switch.

In detection error checking in accordance with the present invention, auxiliary contact points for monitoring are used together with a plurality of stationary contact pieces so that combination of contact pieces are determined with a certain regularity which is monitored by a control unit, thereby enabling detection results to be checked. It is therefore possible to realize a fail-safe function with a simple structure.

BRIEF DESCRIPTION OF THE DRAWINGS

FIG. 2 is a diagram of combinations of on and off states at conventional respective positions;

FIG. 4 is a diagram of combinations of on and off states at respective positions in accordance with the present invention.

DESCRIPTION OF THE PREFERRED EMBODIMENT

An embodiment of the present invention will be described below with reference to the accompanying drawings.

Figure 1:
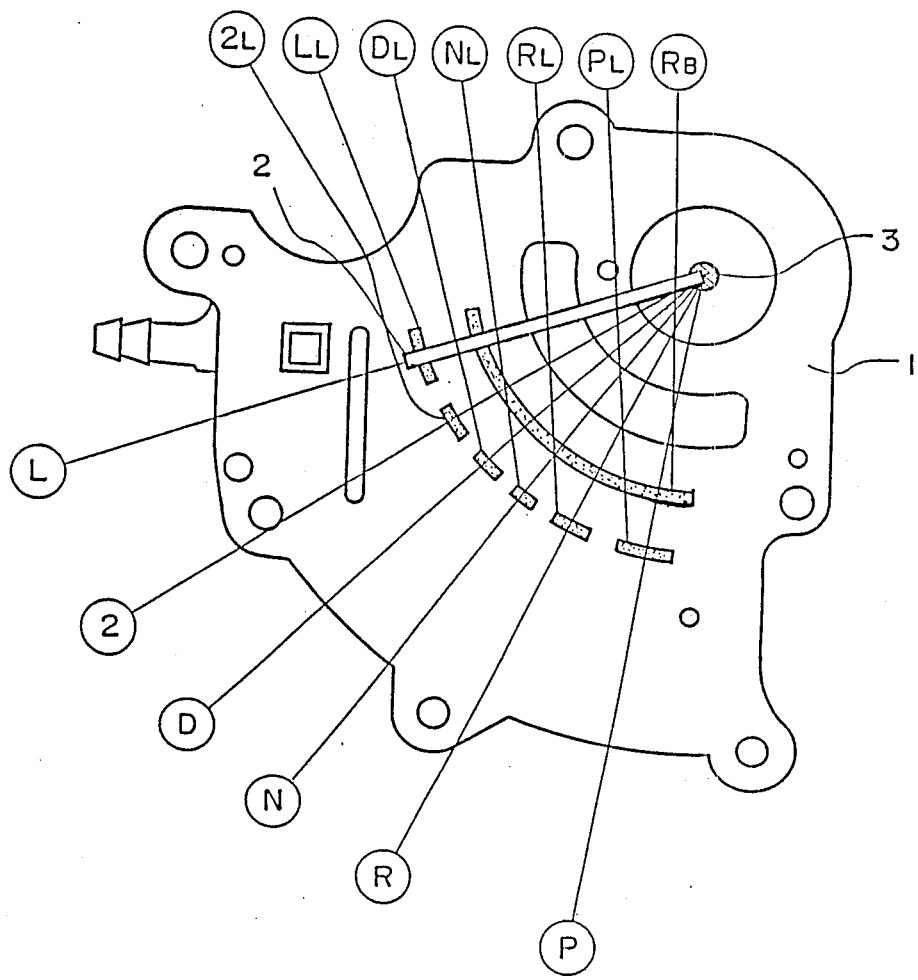
FIG. 1 is a diagram of a conventional shift position detecting switch for automatic transmissions.
Figure 3:
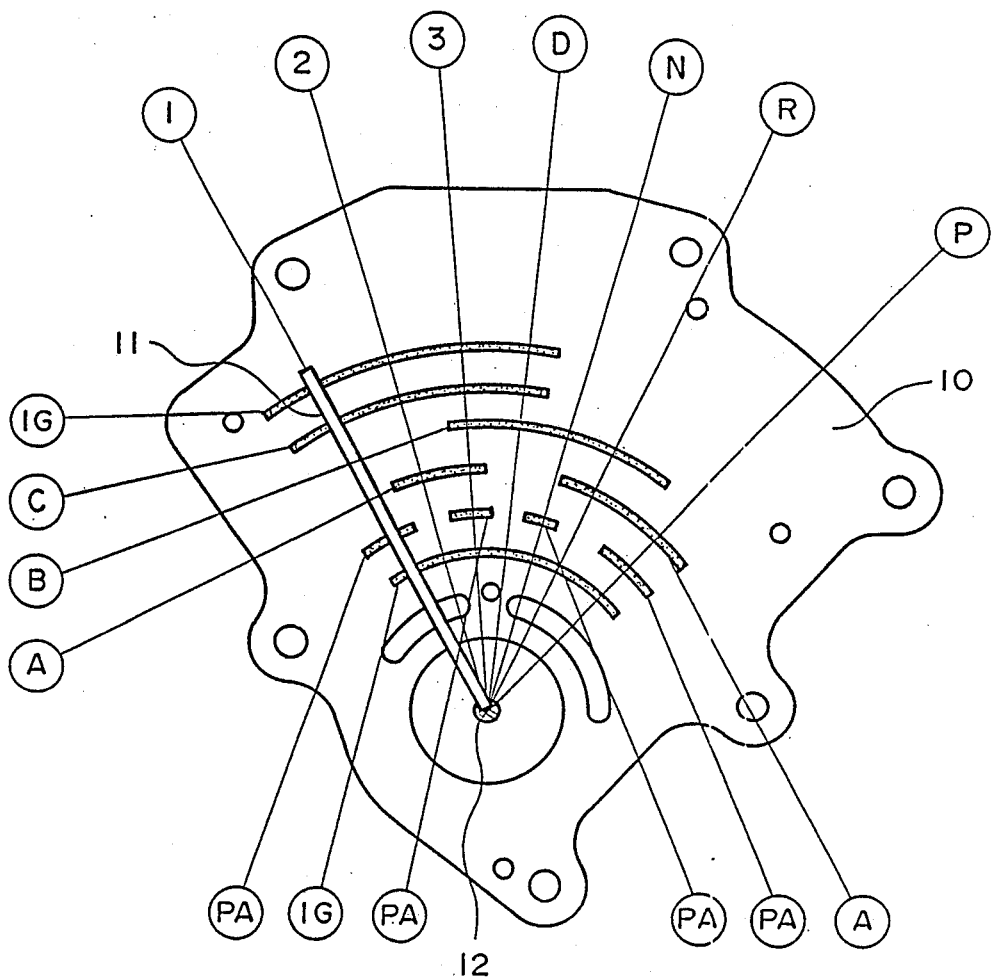
FIG. 3 is a diagram of a shift position detecting switch for automatic transmissions which represents an embodiment of the present invention.

FIG. 3 shows the construction of a shift position detecting switch for automatic transmissions which represents an embodiment of the present invention. In this specification, the switch of the present invention will be described by way of example as a seven-position type of position detecting switch.

As shown in FIG. 3, on a terminal plate 10 made of a resin are formed first to sixth rows of stationary contact pieces which extend circumferentially about a pivot support shaft 12 of a movable contact piece 11 and which are radially spaced in this order from an inner position to an outer position. The first row consists of a contact piece IG connected to an ignition system; a second row consists of four monitoring contact pieces PA for detecting abnormalities; the third row consists of two primary contact pieces A; the fourth row consists of a secondary contact piece B; the fifth row consists of a tertiary contact piece C, and the sixth row consists of a stationary contact piece IG. That is, these stationary contact pieces are mounted in the terminal plate 10 by insert molding with a resin, and the movable contact piece 11 can be moved over the terminal plate 10 in a linked relationship with the shifting over of the shift positions of the automatic transmission so as to effect switching on/off operations with contact points in respective rows at each shift position. There is a desired arrangement of on-off states of the contact points of the stationary contact pieces A, B, C, PA relative to the stationary contact pieces IG. FIG. 4 shows the combinations of on and off states at respective positions.

The switching on/off operation at each position will be described below.

First, when the movable contact piece 11 is located at a position P (parking position) after being moved in a linked relationship with the shifting to the corresponding shift position of the automatic transmission, the contact points PA and A are in the on state, and the contact points B and C are in the off state.

When the movable contact piece 11 is located at a position R (reverse position), the contact point PA is off, the contact point A on, the contact point B on, and the contact point C off.

When the movable contact piece 11 is located at a position N (neutral position), the contact point PA is on, the contact point A off, the contact point B on, and the contact point C off.

When the movable contact piece 11 is located at a D-range position, the contact point PA is off, the contact point A off, the contact point B on, and the contact point C on.

When the movable contact piece 11 is located at a third-range position, the contact point PA is on, the contact point A on, the contact point B on, and the contact point C on.

When the movable contact piece 11 is located at a second-range position, the contact point PA is off, the contact point A on, the contact point B off, and the contact point C on.

When the movable contact piece 11 is located at a first-range position, the contact point PA is on, the contact point A off, the contact point B off, and the contact point C on.

Thus, the combinations of on and off states are determined in such a manner that one of the contact points PA is in the on state when the number of on contact points of the contact points A to C is an odd number, that there is no contact point PA in the on state when the number of on contact points of the contact points A to C is an even number, and that the number of on contact points of the four contact points including one of the PA contact points is always an even number at each position.

That is, in the checking of detection errors in accordance with the present invention, a regulation that the number of on contact points of these four contact points is an even number is utilized, and a control unit (not shown) checks detection results by monitoring this number, thereby attaining a fail-safe function.

The present invention is not limited to the above-described embodiment; other various modifications based on the spirit of the present invention are possible and they are not excluded from the scope of the present invention.

What is claimed is:

1. A switch for detecting shift positions of an automatic transmission in which a movable contact piece is moved in a linked relationship with the shifting over of shift positions of the transmission so as to effect switching with each of stationary contact pieces corresponding to said shift positions, said switch comprising:
   stationary monitoring contact pieces disposed in combination with said stationary contact pieces corresponding to said shift positions in order to output a predetermined combination signal.

2. A switch for detecting shift positions of an automatic transmission according to claim 1, wherein said predetermined combination signal indicates normal or abnormal conditions by whether the number of signals representing on states with respect to one of said positions is an even number or an odd number.

3. A switch for detecting shift positions of an automatic transmission according to claim 1, wherein said stationary contact pieces corresponding to said positions are disposed in three rows, said stationary monitoring contact pieces are provided in combination with said stationary contact pieces, and said rows of stationary contact pieces and said stationary monitoring contact pieces are selectively bridged by said movable contact piece to perform switching operation.

4. A switch, operable off an ignition circuit, for detecting shift positions of an automatic transmission, said switch comprising:
   a switch plate;
   an ignition conductor path, for connection with the ignition circuit, disposed on said switch plate around at least a portion of a first circle;
   at least second, third, fourth and fifth stationary conductor paths disposed on said switch plate around at least portions of second, third, fourth and fifth circles being concentric with said first circle;
   an elongated movable contact piece bridging said ignition conductor path and said stationary conductor paths in said first through fifth circles and having one end mounted on said switch plate for rotation about the center of said concentric circles, responsive to shifting of the transmission;
   one or more stationary contacts disposed in each of said stationary conductor paths for selective connection to said ignition conductor path through said movable contact piece, in accordance with shift position, said stationary contacts being positioned in said stationary conductor paths so that the total number of stationary contacts connected through said movable contact in all shift positions is even.

5. The switch of claim 4 wherein a plurality of spaced stationary contacts are positioned along the conductor path of said second circle so that (1) there is no connection between said movable contact and said second conductor path when the number of connections between said movable contact and said third, fourth and fifth conductor paths is even and (2) there is connection between said movable contact and said second conductor path when the number of connections between said movable contact and said third, fourth and fifth conductor paths is odd.

* * * * *